US006394305B1

(12) United States Patent
Sydlosky et al.

(10) Patent No.: US 6,394,305 B1
(45) Date of Patent: May 28, 2002

(54) FOOD HOLDER AND LIFTER WITH ADJUSTABLE HANDLES

(76) Inventors: Beverly Sydlosky; Kerry Himmelberger, both of 1650 White Bear Rd., Birdsboro, PA (US) 19508

(*) Notice: Subject to any disclaimer, the term of this patent is extended or adjusted under 35 U.S.C. 154(b) by 0 days.

(21) Appl. No.: 09/943,264

(22) Filed: Aug. 31, 2001

(51) Int. Cl.[7] ............................................. B65D 25/28
(52) U.S. Cl. ....................... 220/753; 220/754; 220/493; 220/752
(58) Field of Search ................................ 220/754, 753, 220/752, 493

(56) References Cited

U.S. PATENT DOCUMENTS

| 2,613,847 A | * | 10/1952 | Lacher | 220/754 |
| 2,979,844 A | * | 4/1961 | Lattuca | 220/754 |
| 3,004,657 A | * | 10/1961 | Hyman | 220/754 |
| 4,068,779 A | * | 1/1978 | Canfield | 220/754 |
| 4,852,760 A | | 8/1989 | Sarnoff et al. | 220/85 H |
| 5,564,568 A | * | 10/1996 | Rankin, Sr. | 220/754 |

* cited by examiner

Primary Examiner—Joseph M. Moy
(74) Attorney, Agent, or Firm—Michael F. Petock, Esq.

(57) ABSTRACT

An apparatus for holding and lifting items of food for use in connection with cooking includes a network comprised of interconnected flexible heat resistant plastic members and handles formed on two opposite sides of the network, with each of the handles being comprised of a plurality of flexible heat resistant plastic members connected to the network. A portion of the handle members may be removed to adjust the length of the handle. In a presently preferred embodiment, the network is comprised of a plurality of concentric circles interconnected by radial members. The handles are preferably formed by extensions of the radial members with a plurality of looping members connected between them. The handles may preferably be adjusted by cutting the radial extension members to remove a preselected number of looping members to adjust the length of the handles.

7 Claims, 2 Drawing Sheets

FOOD HOLDER AND LIFTER WITH ADJUSTABLE HANDLES

FIELD OF THE INVENTION

The present invention relates to a food holder and lifter with adjustable handles. More particularly, the present invention relates to a food holder and lifter with adjustable handles wherein the food may be held together during cooking in a cooking vessel and lifted out of the vessel without the use of utensils, keeping the cooked food items intact.

BACKGROUND OF THE INVENTION

Various items of food from various meats including poultry and fish to vegetables are cooked in pots and pans. These items need to be placed into the pot or pan for cooking and then removed from the pot or pan at the end of the cooking process. It is desirable, for aesthetic purposes, to keep the cooked food intact. However, once the food is cooked, it is often soft and/or falling apart. The use of utensils such as forks, large forks, tongs, spatulas or the like used to extract the hot food from the hot pot or pan exasperates the problems of breaking the food item apart.

SUMMARY OF THE INVENTION

An advantage of the present invention is that various food items from various meats including poultry and fish to various vegetables and everything in between may be placed on the food holder and lifted into the pan.

Another, and even greater, advantage is that the food is held together on the holder and may be lifted out of the hot pot or pan upon the completion of the cooking process by grasping the handles and lifting the cooked food item out of the hot pot or pan intact, that is, without it breaking or falling apart.

Another advantage of the present invention is that the length of the handles may be easily and readily adjusted.

Briefly and basically, in accordance with the present invention, an apparatus is provided for holding and lifting items of food for use in connection with cooking which includes a network comprised of interconnected flexible heat resistant plastic members and handles formed on two opposite sides of said network. Each of said handles comprises a plurality of members comprised of flexible heat resistant plastic connected to the network wherein one or more of the handle members may be removed to adjust the length of the handle. In a presently preferred embodiment, the network is comprised of a plurality of concentric rings of flexible heat resistant plastic material interconnected by radially extending members comprised of flexible heat resistant plastic material. Further, in a presently preferred embodiment, the handles may be formed by the extension of two radial members beyond the outermost concentric member, with the extensions of the radial members being connected by a plurality of looping flexible heat resistant plastic members forming a gripping portion of the handle.

In a presently preferred embodiment, the length of the handles may be adjusted by cutting the radial extensions at a desired point between two looping flexible heat resistant plastic members which form the gripping portion of the handle.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a view in perspective illustrating a food holder and lifter with adjustable handles in accordance with the present invention, which also illustrates in dotted outline the adjustment process wherein a portion of the handle may be removed by cutting with a scissors, knife or the like.

DETAILED DESCRIPTION OF THE PREFERRED EMBODIMENTS

Figure 1:
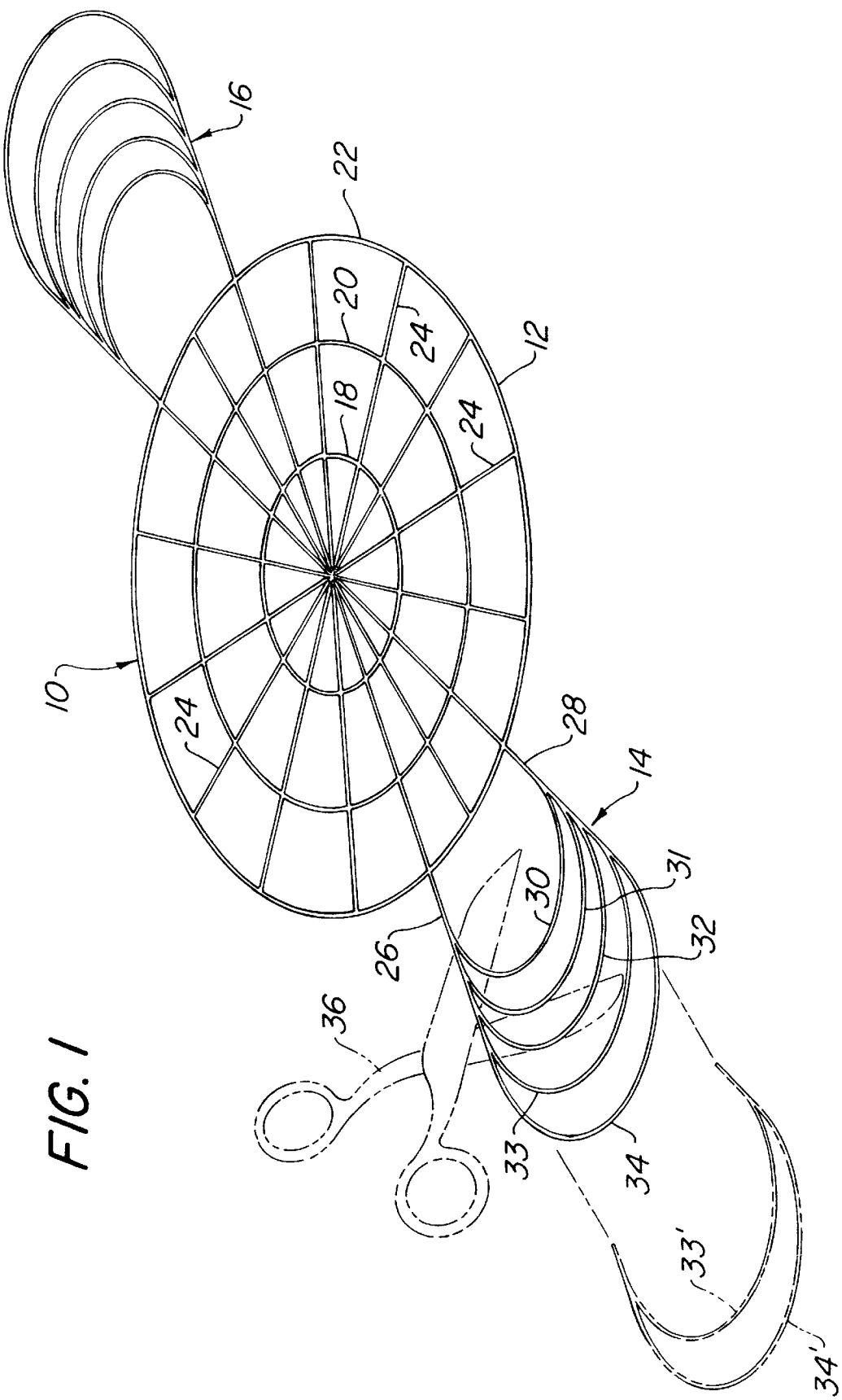

Referring now to the drawings wherein like numerals indicate like elements, there is shown in FIG. 1 a food holder and lifter with adjustable handles 10 which is comprised of a network of interconnected flexible heat resistant plastic members 12 and handles 14 and 16 formed on two opposite sides of network 12. Each of the handles 14 and 16 being comprised of flexible heat resistant plastic connected to network 12 wherein a portion of the handle members 14 and 16 may be removed to adjust the length of the handle.

As illustrated in FIG. 1, in a presently preferred embodiment, the network is comprised of a plurality of concentric rings 18, 20 and 22, each constructed of flexible heat resistant plastic material interconnected by radially extending members 24. Radially extending members 24 are also constructed of flexible heat resistant plastic material. In a presently preferred method of manufacturing, the entire network 10 along with handles 14 and 16 would be molded in a single plastic molding process. In a presently preferred embodiment, the radius of outermost concentric ring 22 is 5½ inches. However, it is understood that various other dimensions may be utilized, and may even be preferable for particular applications with respect to particular cooking vessels such as particular diameters of pots, cooking crocks and the like. Further, it may be preferable to have different diameters for different size food items. However, the presently preferred radius of 5½ inches is believed to be a convenient size which will be adaptable to many applications.

Handles 14 and 16 are substantially identical being located on opposite sides of network 12 comprised of the interconnected radial members and concentric rings. Each of the handles 14 and 16 are constructed of radial extensions of radial members. Referring to handle 14, handle 14 is constructed of radial extensions 26 and 28. Radial extensions 26 and 28 may be adjacent radial members, but in a presently preferred embodiment, there is one intervening radial member. In a present preferred embodiment, the arc between radial extension members 26 and 28 is approximately 22.5 degrees. However, this angle could be anywhere from approximately 15 to 30 degrees. In a presently preferred embodiment, connected between radially extending members 26 and 28 are a plurality of looping flexible heat resistant plastic members which form the gripping portion of the handle, with the looping members being designated as elements 30 through 34. As illustrated in FIG. 1, if it were desired to shorten the handle length so that loop 32 forms the outermost handle grip, radial extension members could be cut using scissors 36, a knife or any other cutting instrument to cut the radial extension members 26 and 28 at a point between looping members 32 and 33. This would then remove looping or gripping members 33' and 34' as shown in dotted lines in FIG. 1. If desired, the same procedure could be carried out with respect to handle 16.

Figure 2:
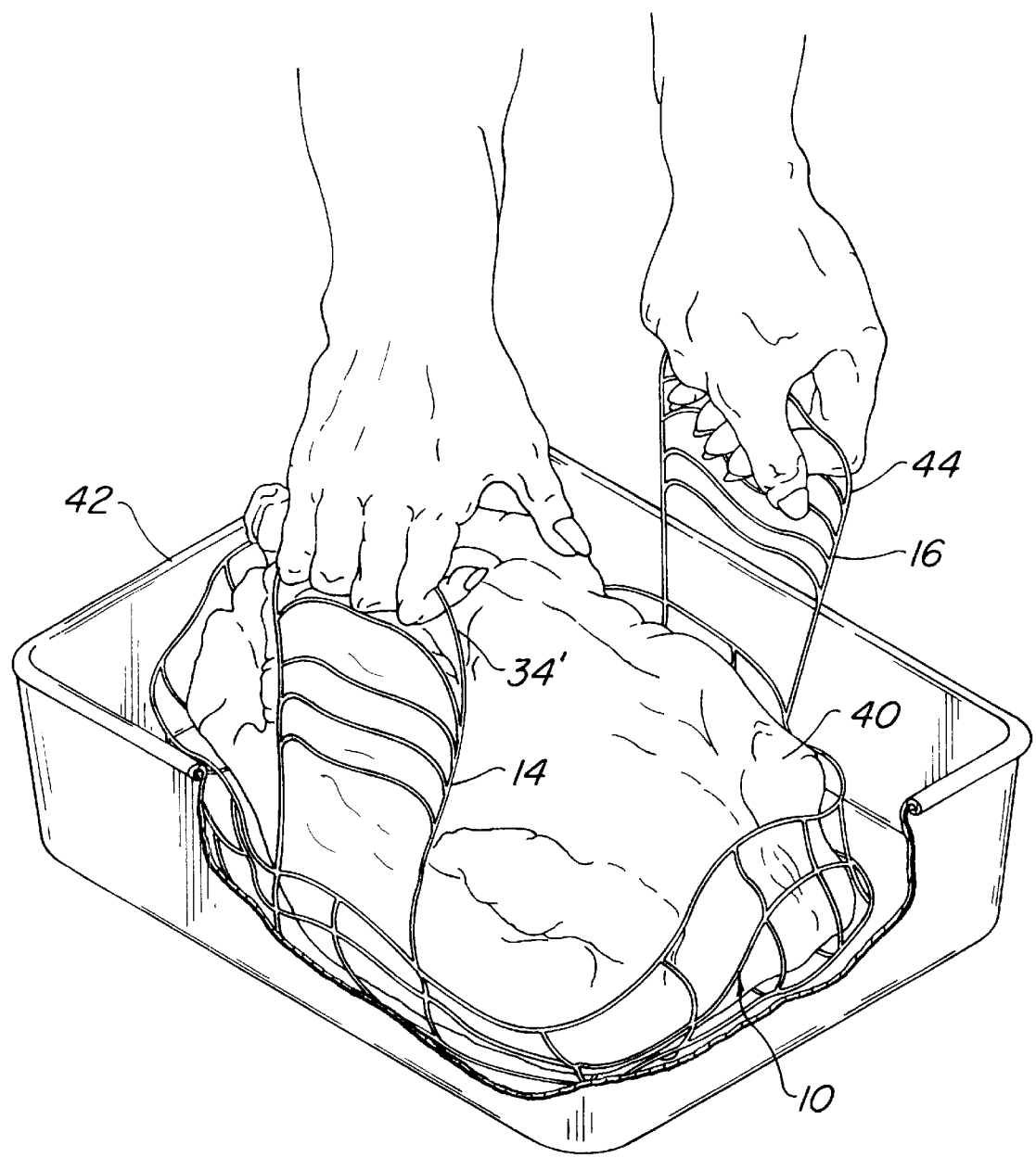
FIG. 2 is a view in perspective illustrating a food item in the form of poultry being lifted from a cooking vessel.

Referring now to FIG. 2, there is shown an item of poultry 40 being held and lifted using a food holder and lifter with adjustable handles 10 in accordance with the present invention. Poultry 40 on lifter 10 is being lifted from a cooking vessel 42. As illustrated in FIG. 2, none of the looping gripping portions have been removed and the fingers of one hand of the person lifting the item of poultry 40 are around looping or gripping member 34' of handle 14 and the fingers of the other hand of the person lifting the item of poultry are around looping or gripping member 44 of handle 16.

It is understood that the food holder and lifter with adjustable handles 10 of the present invention may be made of any suitable flexible plastic material which will withstand the normal temperatures of cooking without melting or becoming so soft as to be unusable in lifting the food item. Temperatures usually utilized in cooking do not exceed approximately 350 to 450 degrees fahrenheit. The flexible plastic is in contact with the food and its temperature usually does not exceed the temperature of the food being cooked. One presently preferred suitable material is food grade nylon, such as Monsanto 22X nylon 66 which is commercially available, but various other materials may be utilized. In a presently preferred embodiment, the diameter of the flexible plastic material may be approximately 1/32 of an inch, but it is understood that other diameters and sizes of suitable heat resistant flexible plastic material may be utilized.

The present invention may be utilized in connection with the cooking of any type of a food item which needs to be placed into a cooking vessel and removed from a cooking vessel upon the completion of the cooking process, with the food item remaining intact.

The present invention may be embodied in other specific forms without departing from the spirit or essential attributes thereof and, accordingly, reference should be made to the appended claims, rather than to the foregoing specification as indicating the scope of the invention.

We claim:

1. An apparatus for holding and lifting items of food for use in connection with cooking, comprising:

a network comprised of interconnected flexible heat resistant plastic members, said heat resistant plastic being adapted to withstand cooking temperatures without melting;

handles formed on two opposite sides of said network extending beyond the periphery of said network, each of said handles comprising a plurality of looping flexible members comprised of flexible heat resistant plastic adapted to withstand cooking temperatures without melting integrally formed with said network but extending beyond the periphery of said network, each looping flexible member forming a gripping portion and being designed to be selectively cut off to shorten the handle, wherein at least one of said looping flexible members may be removed to adjust the length of the handle.

2. An apparatus in accordance with claim 1 wherein said network is comprised of a plurality of concentric rings of flexible heat resistant plastic material interconnected by radially extending members comprised of flexible heat resistant plastic material.

3. An apparatus for holding and lifting items of food for use in connection with cooking, comprising:

a network comprised of interconnected flexible heat resistant plastic members, said network being comprised of a plurality of concentric rings of flexible heat resistant plastic material interconnected by radially extending members comprised of flexible heat resistant plastic material;

handles formed on two opposite sides of said network, each of said handles comprising a plurality of members comprised of flexible heat resistant plastic connected to said network, wherein a portion of said handle members may be removed to adjust the length of the handles, said handles being formed by the extension of two radial members beyond an outermost concentric member, said extensions of said radial members being connected by a plurality of looping flexible heat resistant plastic members forming a gripping portion of said handle.

4. An apparatus in accordance with claim 3 wherein said outermost concentric member has a radius of approximately 5½ inches.

5. An apparatus in accordance with claim 3 wherein said extensions of said radial members forming a handle have an angle between them of approximately 22.5 degrees.

6. An apparatus in accordance with claim 3 wherein said flexible heat resistant plastic members have a diameter of approximately 1/32 of an inch.

7. An apparatus is accordance with claim 3 wherein a portion of the handle members may be removed by cutting the extension of the two radial members beyond the outermost concentric member at a point between looping flexible heat resistant plastic members which form a gripping portion of the handle.

* * * * *

UNITED STATES PATENT AND TRADEMARK OFFICE
CERTIFICATE OF CORRECTION

PATENT NO.    : 6,394,305 B1
DATED         : May 28, 2002
INVENTOR(S)   : Sydlosky et al.

It is certified that error appears in the above-identified patent and that said Letters Patent is hereby corrected as shown below:

<u>Column 3,</u>
Line 21, insert a space after "66" and before "which".

Signed and Sealed this

Ninth Day of July, 2002

Attest:

Attesting Officer

JAMES E. ROGAN
*Director of the United States Patent and Trademark Office*